United States Patent
Zhang et al.

(10) Patent No.: US 10,860,487 B2
(45) Date of Patent: Dec. 8, 2020

(54) MULTI-CORE PROCESSING DEVICE AND METHOD OF TRANSFERRING DATA BETWEEN CORES THEREOF

(71) Applicant: Chengdu Haiguang Integrated Circuit Design Co. Ltd., Sichuan Province (CN)

(72) Inventors: Chunhui Zhang, Austin, TX (US); Hao Wang, Austin, TX (US); Daqing Xue, Austin, TX (US)

(73) Assignee: CHENGDU HAIGUANG INTEGRATED CIRCUIT DESIGN CO. LTD., Sichuan (CN)

( * ) Notice: Subject to any disclaimer, the term of this patent is extended or adjusted under 35 U.S.C. 154(b) by 0 days.

(21) Appl. No.: 16/386,438

(22) Filed: Apr. 17, 2019

(65) Prior Publication Data

US 2020/0334153 A1   Oct. 22, 2020

(51) Int. Cl.
| | |
|---|---|
| *G06F 12/0842* | (2016.01) |
| *G06F 12/0811* | (2016.01) |
| *G06F 12/02* | (2006.01) |
| *G06F 12/0891* | (2016.01) |
| *G06F 12/0873* | (2016.01) |

(52) U.S. Cl.
CPC ...... *G06F 12/0842* (2013.01); *G06F 12/0292* (2013.01); *G06F 12/0811* (2013.01); *G06F 12/0873* (2013.01); *G06F 12/0891* (2013.01)

(58) Field of Classification Search
CPC ............. G06F 12/0842; G06F 12/0292; G06F 12/0811; G06F 12/0873; G06F 12/0891; G06F 12/0806; G06F 12/084; G06F 12/0862
See application file for complete search history.

(56) References Cited

U.S. PATENT DOCUMENTS

| | | | | |
|---|---|---|---|---|
| 2003/0004683 | A1* | 1/2003 | Nemawarkar | G06F 9/3851 702/186 |
| 2006/0085602 | A1* | 4/2006 | Huggahalli | G06F 9/345 711/137 |
| 2012/0210071 | A1* | 8/2012 | Black | G06F 12/0802 711/130 |
| 2018/0081569 | A1* | 3/2018 | Kan | G06F 12/0868 |
| 2019/0102303 | A1* | 4/2019 | Wang | G06F 12/084 |
| 2019/0196968 | A1* | 6/2019 | Beckmann | G06F 12/0862 |

* cited by examiner

*Primary Examiner* — Michael Krofcheck
(74) *Attorney, Agent, or Firm* — Barnes & Thornburg LLP; G. Peter Nichols

(57) ABSTRACT

A multi-core processing device and an inter-core data transmission method thereof are disclosed, the multi-core processing device includes a plurality of cores; each core includes at least one level cache, and when any core as a target core or of a target core group receives a cache line deliver request instruction from another core as a source core, the any core pre-fetches a corresponding cache line from the source core to a cache of the any core; and the cache line deliver request instruction includes an identifier hint of the target core.

19 Claims, 3 Drawing Sheets

MULTI-CORE PROCESSING DEVICE AND METHOD OF TRANSFERRING DATA BETWEEN CORES THEREOF

TECHNICAL FIELD

Embodiments of the present disclosure relate to a multi-core processing device and a method of transferring data between cores thereof.

BACKGROUND

Core to Core (C2C) communication is now critical in many computer applications such as packet processing, high performance computing, machine learning and data center/cloud workloads. In a multi-core/many-core processor, due to increase in the number of cores, C2C communication usually becomes a limiting factor in performance increase and decrease when workloads share data. On a general-purpose platform, shared memory space between cores is usually used for implementing effective C2C communication.

Workloads may be processed in a multi-core CPU in a task-pipelined manner. For example, Core0 finishes task0, and then passes to Core1 to conduct task1, while the processed data by Core0 is retrieved by Core1. Such task-pipelined processing can be found in network or communication applications. Today, x86 systems handle it via such a "pull model", as the data processed by Core0 could be ready in Core0's private caches (e.g., a first level cache or a second level cache), but waiting for the pull when used by other cores.

However, the above-described solution has relatively long data transmission latency in crossing cache-hierarchy, and as the number of cores participating in the task pipeline increases, the latency problem is getting worse and processor processing efficiency of the multi-core processor is greatly affected.

SUMMARY

An embodiment of the present disclosure provides a multi-core processing device, comprising a plurality of cores, each core includes at least one level cache, and when any core as a target core or of a target core group receives a cache line deliver request instruction from another core as a source core, it pre-fetches a corresponding cache line from the source core to a cache of the any core; and the cache line deliver request instruction includes an identifier hint of the target core.

Optionally, the cache line deliver request instruction includes a virtual address of the cache line and includes a target software thread identifier; the multi-core processing device further comprises an inter-core processing unit coupled with the plurality of cores. The inter-core processing unit includes: a hardware mapping table coupled with the plurality of cores and shared by the plurality of cores, the hardware mapping table storing a mapping relationship between the target software thread identifier corresponding to the cache line and a target physical core identifier; a lookup unit, configured to look up the hardware mapping table, to obtain the target physical core identifier corresponding to the target software thread identifier included in the cache line deliver request; and an instruction dispatch unit, configured to dispatch the cache line deliver request to the target core corresponding to the target physical core identifier searched through the lookup unit.

Optionally, the target physical core identifier in the hardware mapping table is a physical identifier of a core, or a group of cores, or all cores of the multi-core processing device.

Optionally, the hardware mapping table is suitable to be configured at system initialization or resetting time, the target software thread identifier is assigned by a parallel compiler at compiling time; the target physical core identifier is configured to be obtained at the initialization or resetting time of the multi-core processing device, and the target physical core identifier is based on system topology.

Optionally, the cache line deliver request instruction further includes an identifier hint of a cache of the target core corresponding to the cache line.

Optionally, the core includes a data pre-fetch, and the target core is configured to receive the cache line deliver request instruction through the data pre-fetch of the target core.

Optionally, the data pre-fetch is a hardware pre-fetch.

Optionally, each level of cache of the target core has a corresponding hardware pre-fetch.

Optionally, the cache line deliver request instruction further includes a state hint of the cache of the target core corresponding to the cache line, and the state hint is Shared/Own.

Optionally, the cache line deliver request instruction further includes a priority hint of the cache line deliver transaction.

Optionally, a priority of the cache line deliver request instruction satisfies any one of types below: higher than a priority of other pre-fetch transaction, equal to a priority of a preset instruction, or corresponding to different priorities based on different memory requests.

Optionally, the source core comprises a load-store unit, and the load-store unit or any level cache of the source core is configured to send the cache line deliver request instruction.

Optionally, the load-store unit of the source core is configured to read out the cache line from a cache array and write into a victim buffer, if the cache line is dirty or a next level cache is non-inclusive, on a cache hit.

Optionally, the load-store unit of the source core is configured to drop the cache line deliver request instruction, when the target core has already requested the cache line, upon a cache miss.

Optionally, the load-store unit of the source core is configured to send the cache line deliver request instruction to a next level cache to decide how to proceed, upon a cache miss.

Optionally, any middle level cache of the source core includes an internal snoop-response interface, configured to deliver the cache line deliver request instruction, and the any middle level cache is inclusive.

Optionally, any non-first level cache of the source core is configured to, upon a cache hit, invalidate the cache line, if the cache line deliver request instruction requests dirty data from a previous level cache, else read out the cache line data.

Optionally, any non-first level cache of the source core is further configured to write the cache line data in a victim buffer of a middle level cache, where the cache line data wait to be sent out.

Optionally, any non-first level cache of the source core is configured to drop the cache line deliver request instruction, upon a cache miss.

Optionally, in the multi-core processing device, the inter-core processing unit further includes: an external snoop request channel, configured to deliver the cache line deliver request instruction to the target core.

Optionally, the plurality of cores belong to different core complexes or clusters, respective core complexes or clusters are coupled through an interconnect structure, and the hardware mapping table is respectively coupled with the respective core complexes or clusters.

Optionally, the multi-core processing device further comprises: at least one level shared cache, the shared cache is respectively coupled with the plurality of cores, and the at least one level shared cache respectively has a corresponding hardware mapping table thereof or there is only one level shared cache having a corresponding hardware mapping table.

Optionally, the multi-core processing device further comprises: local last level caches respectively corresponding to the plurality of cores; the respective cores are configured to access local last level caches of other cores through an on-chip interconnect structure, and the respective local last level caches respectively have corresponding hardware mapping tables thereof.

Optionally, the source core is a producer core; and the target core is a consumer core.

Some embodiments of the present disclosure further provide a method of transferring data between cores (i.e., an inter-core data transmission method) of a multi-core processing device, the multi-core processing device comprising a plurality of cores, each core includes at least one level cache; and the data transmission method comprising: receiving, by any core as a target core or of a target core group, a cache line deliver request instruction from another core as a source core; and pre-fetching a corresponding cache line from the source core into a cache of the target core hinted in the cache line deliver request.

Optionally, the multi-core processing device comprises an inter-core processing unit, the inter-core processing unit includes a hardware mapping table, the hardware mapping table is coupled with the plurality of cores and shared by the plurality of cores; and when receiving the cache line deliver request instruction from the source core, the inter-core processing unit looks up a target physical core identifier corresponding to a target software thread identifier in the cache line deliver request instruction in the hardware mapping table and dispatches the cache line deliver request to the target core corresponding to the target physical core identifier found out.

Optionally, the target physical core identifier in the hardware mapping table is a physical identifier of a core, or a group of cores, or all cores of the multi-core processing device.

Optionally, the hardware mapping table is configured at system initialization time, the target software thread identifier is assigned by a parallel compiler at compiling time; the target physical core identifier is configured to be obtained at initialization time of the multi-core processing device, and the target physical core identifier is based on system topology.

Optionally, the cache line deliver request instruction further includes an identifier hint of a cache of the target core corresponding to the cache line.

Optionally, the cache line deliver request instruction is received by a data pre-fetch of the target core.

Optionally, the cache line deliver request instruction further includes a priority hint of the cache line deliver transaction.

Optionally, a priority of the cache line deliver request instruction satisfies any one of types below: higher than a priority of other pre-fetch transaction, equal to a priority of a preset instruction, or corresponding to different priorities based on different memory requests.

Optionally, the cache line deliver request instruction is sent by a load-store unit or any private cache of the source core.

Optionally, the data transmission method further comprises: reading out the cache line from a cache array and writing into a victim buffer, if the cache line is dirty or a next level cache is non-inclusive, on a cache hit.

Optionally, the data transmission method further comprises: sending the cache line deliver request instruction to the next level cache, as the victim buffer gets drained.

Optionally, the data transmission method further comprises: dropping, by the load-store unit of the source core, the cache line deliver request instruction, if the target core has already requested the cache line, on a cache miss; or sending, by the load-store unit of the source core, the cache line deliver request instruction to a next level cache to decide how to proceed, upon a cache miss.

Optionally, the data transmission method further comprises: invalidating, by any non-first level cache of the source core, the cache line, if the cache line deliver request instruction requests dirty data from a previous level cache; else, reading out the cache line data, on a cache hit.

Optionally, the data transmission method further comprises: writing, by any non-first level cache of the source core, the cache line data in a victim buffer of the non-first level cache, waiting the cache line data to be sent out.

Optionally, the data transmission method further comprises: dropping, by any non-first level cache of the source core, the cache line deliver request instruction, upon a cache miss.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art may obtain other embodiment(s), without any inventive work, which should be within the scope of the present disclosure.

As described above, X86 systems currently handle it via such a "pull model", as data processed by Core0 could be ready in Core0's private cache (e.g., a first level cache or a second level cache), but waiting for the pull when used by other cores.

Figure 1:
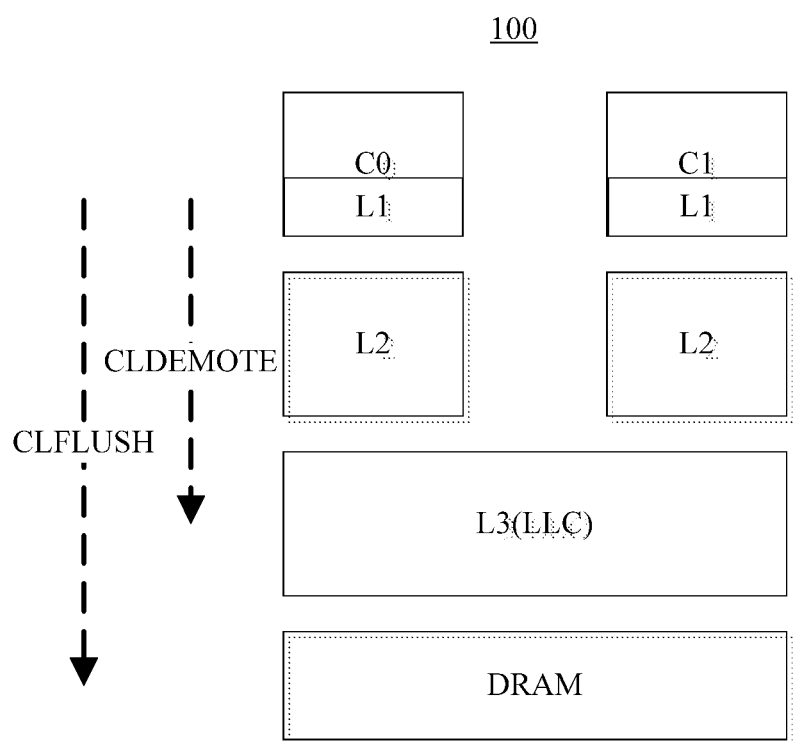
FIG. 1 is a principle schematic diagram of an inter-core data transmission method of a multi-core processor.

With reference to FIG. 1, a multi-core processor comprises a plurality of cores such as cores C0 and C1, each core has its own private cache (for example, a first level cache L1 and a second level cache L2), and the multi-core processor further comprises a shared cache L3 coupled with the plurality of cores. In an example of FIG. 1, L3 is also a last level cache (LLC) of the multi-core processor, and L3 is coupled with a dynamic random access memory (DRAM) (not shown).

Currently, one working mode of the above-described multi-core processor is that, for example, the core C0 evicts dirty data to the DRAM through a CLFLUSH instruction, for other cores such as C1 to read out from the DRAM during use. Another mode is that, a cache line (Cacheline, also referred to as a cache block) is downgraded from the cache-hierarchy through a CLDEMOTE instruction, for example, the core C0 downgrades the cache line from the private cache L1 to the shared cache L3 (LLC), for other cores such as C1 to obtain from the shared cache L3 (LLC) during use.

However, in the above-described multi-core processor, regardless of whether the cache line is evicted to DRAM in the CLFLUSH mode or the cache line is downgraded to the shared cache in the CLDEMOTE mode, data transmission latency is relatively long in a crossing cache-hierarchy, and with the number of cores participating in a task pipeline increases, the latency problem is getting worse and processor processing efficiency is greatly affected.

Some embodiments of the present disclosure provide a multi-core processing device, comprising: a plurality of cores, each core includes at least one level cache, and when any core as a target core or of a target core group receives a cache line deliver request instruction from a source core, it pre-fetches a corresponding cache line from the source core to a cache of the any core; and the cache line deliver request instruction includes an identifier hint of the target core.

An embodiment of the present disclosure further provides an inter-core data transmission method of a multi-core processor, the multi-core processing device comprising a plurality of cores, each core includes at least one level cache, and the data transmission method comprising: receiving, by any core as a target core or of a target core group, a cache line deliver request instruction from another core as a source core; and pre-fetching a corresponding cache line from the source core into a cache of the target core hinted in the cache line deliver request.

In some embodiments of the present disclosure, when any core as a target core or of a target core group receives a cache line deliver request instruction from a source core, it pre-fetches a corresponding cache line from the source core to a cache of the any core, other than looking up when the target core needs the cache line, which, thus, may greatly shorten inter-core data transmission latency of a multi-core processing device, and may further improve a data processing speed and optimize a data processing performance.

Further, a mapping relationship between a target software thread identifier corresponding to the cache line and a target physical core identifier is stored by a hardware mapping table coupled with the plurality of cores and shared by the plurality of cores, the target software thread identifier is assigned by a parallel compiler at compiling time; the target physical core identifier is configured to be obtained at initialization time of the multi-core processing device, and the target physical core identifier is based on system topology. The operating system automatically updates the hardware thread mapping table dynamically during an application startup process, so a software developer may directly use the cache line deliver request instruction, without having to pay attention to underlying hardware configuration, so that difficulty in software development may be reduced.

Further, delivering the cache line deliver request instruction directly to a hardware pre-fetch of the target core may minimize intrusiveness to a remote agent, so as to avoid complexity of meshing up with memory coherence issues.

Further, setting a priority of cache line deliver data included in the cache line deliver request instruction higher than a priority of other pre-fetch transaction may further shorten inter-core data transmission latency, and optimize a performance of the multi-core processing device; setting the priority of the cache line deliver transaction based on different memory requests may enable the multi-core processing device to implement system resource intensive management and configuration; and setting the priority of the cache line deliver transaction equal to a priority of a specific transaction according to needs may enhance flexibility and refinement of priority settings.

Since the source core comprises a load-store unit, and the load-store unit or any level cache of the source core may send the cache line deliver request instruction, the cache line deliver request instruction may meet a data deliver demand of respective cache-levels among different cores.

Further, on a cache hit, the source core sends the cache line deliver request instruction, which may meet a workload processing demand among the plurality of cores in a task-pipelined manner, and shorten overall latency of a task pipeline.

Further, the hardware mapping table may be set among respective core complexes or clusters, so that fast pre-fetch of a cache line across core complexes or clusters may be implemented, to reduce data transmission latency.

Further, at least one level shared cache coupled with the plurality of cores in the multi-core processing device may respectively have its own corresponding hardware mapping table, so in a procedure when the cache line is delivered to the target core, it may be firstly delivered to a shared cache of a corresponding level, so as to shorten data transmission latency, improve the data processing speed of the multi-core processing device, and optimize the data processing performance.

Further, with respect to the multi-core processing device having local last level caches (LLCs) respectively corresponding to the plurality of cores, and the respective cores configured to access LLs of other cores through an on-chip interconnect structure, that is, with respect to a multi-core processor of a non-uniform cache access (NUCA) architecture, through hardware mapping tables respectively corresponding to the respective local LLCs, data may be transmitted to the LLC corresponding to the target core, instead of having to be transmitted to a private cache of the target core, which may also implement fast delivery of the cache line of the multi-core processing device of a distributed shared cache structure to a certain extent.

In addition, since the cache line deliver request instruction is only used for triggering data pre-fetch of the target core, it is non-architecture, so it may be treated as a null operation (NOP), without affecting functionality of the multi-core processing device if get lost.

Figure 2:
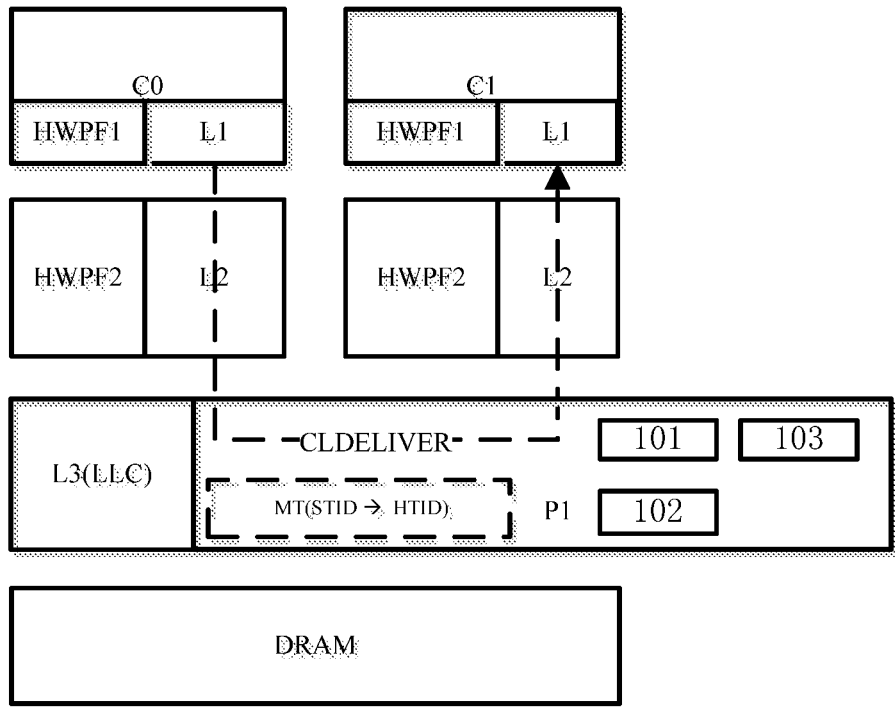
FIG. 2 is a structural schematic diagram of a multi-core processor according to some embodiments of the present disclosure.

With reference to a structural schematic diagram of a multi-core processor shown in FIG. 2, in some embodiments of the present disclosure, a multi-core processor 200 comprises: a plurality of cores C0 and C1 (for simplicity of description, only two of the cores are illustrated here, but in specific implementation, there are two or more cores in the multi-core processor 200), each core includes at least one level cache (for example, a first level cache L1 and a second level cache L2). Among the above-described plurality of cores, any core (for example, core C1) as a target core, when receiving a cache line deliver request instruction (for example, CLDELIVER) from any other core (for example, core C0) as a source core, pre-fetches a corresponding cache line from the source core (for example, core C0) to its own cache; and the cache line deliver request instruction includes an identifier hint of the target core.

According to the embodiment of the present disclosure, when any core as the target core or a target core group receives the cache line deliver request instruction from any other core as the source core, it pre-fetches the corresponding cache line from the source core to a cache of the any core, and thus, when the target core needs data in the cache line, it may just read out directly from its own cache without having to read out from a shared cache, for example, L3 (LLC) or from DRAM. Therefore, the multi-core processor according to some embodiments of the present disclosure may greatly shorten inter-core data transmission latency, improve data processing efficiency of the multi-core processor, and optimize a performance of the multi-core processor.

In addition, since the cache line deliver request instruction is only used for triggering data pre-fetch of the target core, it is non-architecture, so it may be treated as a null operation (NOP), without affecting integral functionality of the multi-core processor if get lost.

In some specific implementation modes, the cache line deliver request instruction may include a virtual address of the cache line and a software thread identifier STID of the target core.

As shown in FIG. 2, the multi-core processor may further comprise an inter-core processing unit P1, the inter-core processing unit P1 may include: a hardware mapping table MT coupled with the plurality of cores and shared by the plurality of cores. In operation, the hardware mapping table MT stores a mapping relationship between the target software thread identifier STID corresponding to the cache line and a target physical core identifier HTID.

In some specific implementation modes, the inter-core processing unit P1 may further include a lookup unit 101 and an instruction dispatch unit 102. The lookup unit 101 and the instruction dispatch unit 102 may be implemented by hardware, software, firmware, or any combination thereof.

The lookup unit is configured to look up the hardware mapping table MT, to obtain the target physical core identifier HTID corresponding to the target software thread identifier STID included in the cache line deliver request. The instruction dispatch unit is configured to dispatch the cache line deliver request to the target core corresponding to the target physical core identifier HTID searched through the lookup unit.

The target physical core identifier HTID in the hardware mapping table MT may be an identifier of a core, or an identifier of a group of cores, or an identifier of all cores of the multi-core processor. The specific number corresponding thereto or core types may be configured according to actual needs, which will not be limited in the embodiments of the present disclosure.

In some specific implementation modes, when receiving the cache line deliver request (for example, CLDELIVER) instruction from the source core (for example, core C0), the inter-core processing unit P1 may obtain the target software thread identifier STID included in the hardware cache line deliver request (for example, CLDELIVER) instruction, and look up the target physical core identifier HTID corresponding thereto in the hardware mapping table MT.

In some specific implementation modes, the hardware mapping table MT is suitable to be configured at system initialization time. The target software thread identifier STID may be assigned by a parallel compiler at compiling time; the target physical core identifier HTID is configured to be obtained at initialization time of the multi-core processor, and the target physical core identifier may be based on system topology.

In some embodiments of the present disclosure, CLDELIVER is an instruction, a mapping mechanism of the hardware mapping table MT is required to link the software thread ("STID") to the physical core ("HTID"). The mapping relationship is, at application runtime, maintained by an operating system running in an electronic device including the multi-core processor; the electronic device further includes a memory, and the memory may be of various suitable types, for example, DRAM. A specific type of the operating system will not be limited in the embodiments of the present disclosure, which may be, for example, Unix, Windows, and the like.

Hereinafter, a configuration process of the above-described hardware mapping table will be illustrated through some exemplary application scenarios.

when a program is broken into multiple (slave) threads, the software thread identifier (corresponding to "STID") may be assigned by a parallel compiler (for example, OpenMP) at compiling time, the physical core (slave) thread identifier (corresponding to "HTID") may be obtained at initialization or resetting time of the multi-core processor, and correspondingly, the target software thread identifier STID and the target physical core identifier HTID may be generated.

In some specific implementation modes, a hardware assigned Advanced Programmable Interrupt Controllers (APIC) ID is based on system topology and may include encoding for CPU socket position and cluster information, so in the Multi-core processor/Many-core Processor (MP), the APIC ID may be used as a physical core identifier. In MP systems, the local APIC ID is also used as a processor physical core identifier by the Basic Input/Output System (BIOS) and the operating system; in other words, the operating system has the physical core topology information.

In some specific implementation modes, the operating system (OS) may configure the HTID portion in the hardware mapping table with information passed by the BIOS. When the OS installs a software thread to a remote core, it configures the STID portion in the hardware mapping table, to complete the mapping. Further, when a CLDELIVER transaction dispatches the hardware mapping table of the inter-core processing unit P1, the STID carried by the CLDELIVER transaction will be used to index out the targeted physical core.

According to the above-described embodiment, since the hardware mapping table is automatically configured by the operating system, and the operating system may automatically update the hardware thread mapping table dynamically during an application startup process, a software developer may directly use the cache line deliver request instruction, without having to pay attention to underlying hardware configuration, so that difficulty in software development may be reduced.

In some specific implementation modes, the cache line deliver request instruction CLDELIVER may further include an identifier hint of the cache of the target core corresponding to the cache line, so that the cache line may be directly pre-fetched into a corresponding cache of the target core, so as to minimize data deliver latency.

In some specific implementation modes, the core may include a data pre-fetch, and the target core is configured to process the cache line deliver request through the data pre-fetch. In an embodiment of the present disclosure, the data pre-fetch is a hardware pre-fetch. In some specific implementation modes, each level of cache of the target core may have its own corresponding hardware pre-fetch as described above. As shown in FIG. 2, a hardware pre-fetch HWPF1 corresponds to an L1 cache, and a hardware pre-fetch HWPF2 corresponds to a L2 cache.

Delivering the cache line deliver request instruction directly to the corresponding hardware pre-fetch of the target core may minimize intrusiveness to a remote agent (i.e., the target core), so as to avoid complexity of meshing up with memory coherence issues.

In some specific implementation modes, the cache line deliver request instruction may further include a state hint of the cache of the target core corresponding to the cache line, and the state hint may be Shared/Own. Hinting a state of the target cache may improve cache coherence of a processing device.

In some specific implementation modes, the cache line deliver request instruction may further include a priority hint of the cache line deliver transaction. The priority hint of the cache line deliver transaction may be flexibly set according to needs. For example, a priority of the cache line deliver request instruction may be set higher than a priority of other pre-fetch transaction, or may be set equal to a priority of a preset instruction (for example, a Command instruction), and may even correspond to different priorities based on different memory request types.

In some embodiments of the present disclosure, a CLDELIVER instruction may include "Hints" below: {Broadcast-|Directed(Target-Core-ID); Cache-Level; Cache-State; Priority}, where, "Broadcast" hints to deliver the CLDELIVER instruction to all or some of the other cores, and "Directed" hints to deliver the CLDELIVER instruction only to a specific core. "Target-Core-ID" is configured to represent a target core software thread identifier STID corresponding to the cache line. "Cache-Level" hints a cache of the target core corresponding to the cache line, which may be L1, L2, and the like. "Cache-State" hints that a cache state of the target core may be Shared/Own, and hinting the cache state of the target memory to be Shared/Own may improve cache coherence of a processor. "Priority" is configured to represent a priority of processing the CLDELIVER instruction within the target core, the priority of the cache line deliver request instruction may be set higher than a priority of other pre-fetch transaction, or may be set equal to a priority of a preset instruction (for example, a Command instruction), or may correspond to different priorities based on different memory request types, and specifically, may be flexibly set according to needs.

In some specific implementation modes, the cache line deliver request instruction may be sent by a load-store unit (LSU) or any level private cache of a source core.

In some specific implementation modes, the LSU of the source core may have a case of a cache hit or a cache miss during a processing procedure.

In some embodiments of the present disclosure, before sending the cache line deliver request instruction, an LSU of a source core is configured to read out a cache line from a cache array and write into a victim buffer, if the cache line is dirty or a next level cache is non-inclusive, on a cache hit.

In some embodiments of the present disclosure, an LSU of a source core, on a cache miss, as a design choice, 1) may drop the cache line deliver request instruction, when the target core has already requested the cache line; or 2) may send the cache line deliver request instruction to a next level cache to decide how to proceed.

In some specific implementation modes, unless the LSU decides to drop the CLDELIVER instruction, its physical address and hints are written into the victim buffer. Subsequently, the CLDELIVER instruction with the physical address, the hints, and potential data is sent to the next cache-level (for example, from the L1 cache to the L2 cache).

In some specific implementation modes, as an optional solution, the CLDELIVER instruction may be processed in a private cache (for example, Private L2 Cache (PL2)) of the source core. Any middle level cache (MLC) of the source core may include an internal snoop-response interface, configured to deliver the cache line deliver request instruction, and the any middle level cache is inclusive. Any cache of any core may have a case of a hit or a miss. Any non-first level cache of the source core is configured to, upon a cache hit, invalidate the cache line, if the cache line deliver request instruction requests dirty data from a previous level cache, else read out the cache line data.

In some embodiments of the present disclosure, any non-first level cache of the source core is further configured to write the cache line data in a victim buffer of a middle level cache, where the cache line data wait to be sent out.

In some embodiments of the present disclosure, as an optional design solution, any non-first level cache of the source core is configured to drop the cache line deliver request instruction, upon a cache miss.

In some embodiments of the present disclosure, since the LSU or any level private cache of the source core may send the cache line deliver request instruction, the cache line deliver request instruction may meet a data deliver demand of respective cache-levels among different cores. On a cache hit, the source core sends the cache line deliver request instruction, which may meet a workload processing demand among the plurality of cores in a task-pipelined manner, and shorten overall latency of a task pipeline.

With reference to the structural schematic diagram of the multi-core processor shown in FIG. 2, for example, in core C1, when a load is executed, if it is missing in a first level cache L1, it is necessary to look up a second level cache L2; if it is also missing in the second level cache L2, it is necessary to look up a third level cache L3; if it is further missing in the third level cache L3 (LLC), then it is necessary to read from a memory DRAM. It takes 4 clock cycles to read from the first level cache L1, 12 to 18 clock cycles to read in the second level cache L2, about 40 clock cycles to read in L3, and about 200 clock cycles to read in the memory DRAM, so that the entire process requires more than 200 clock cycles. However, according to some embodiments of the present disclosure, core C1 performs a pre-fetch operation when receiving the CLDELIVER instruction, and may read the corresponding cache line into the first level cache L1, so when core C1 needs the cache line data, it may directly hit in the first level cache L1 of core C1, only with latency of at most 4 cycles. This is the latency that may be shortened in a first level pipeline. With respect to an Nth level pipeline, latency may be shortened N-fold, which may greatly shorten processing latency of the task pipeline, and optimize a processing performance of the multi-core processor.

In some specific implementation modes, the inter-core processing unit P1 may further include: an external snoop request channel 103, configured to deliver the cache line deliver request instruction (CLDELIVER) to the target core.

In some specific implementation modes, the source core may be a producer core, the target core may be a consumer core, and the thread in the source core and the thread in the target core form a basic model for interaction between the producer and the consumer.

It may be understood that, in some embodiments of the present disclosure, the source core (the producer core) or the target core (the consumer core) is relative, and a producer of any cache line data may be referred to as a source core (a producer core), and a core that subsequently uses the cache line data is referred to as a target core (a consumer core). With respect to a multi-level pipeline task, the mode that a plurality of cores needs to share data is relatively common.

In some specific implementation modes, the plurality of cores may belong to different core complexes (CCX) or clusters, and the respective core complexes or clusters may be coupled through an interconnect structure (for example, a bus, a cross-bar switch, Mesh, and the like), and the hardware mapping table may be respectively coupled with the respective core complexes or clusters. With respect to the multi-core processing device comprising the core complexes or clusters, the source core and the target core may be distributed across different core complexes or clusters, so that fast pre-fetch of a cache line across complexes or clusters may be implemented, to reduce data transmission latency.

In some specific implementation modes, the multi-core processing device may comprise at least one level shared cache, and the shared cache is respectively coupled with the plurality of cores. For example, the at least one level shared cache may respectively have its own corresponding hardware mapping table, or there is only one level shared cache (for example, LLC) having a corresponding hardware mapping table. In some specific implementation modes, in a procedure when the cache line is delivered to the target core, it may be firstly delivered to a shared cache of a corresponding level, so as to shorten data transmission latency, improve the data processing speed of the multi-core processing device, and optimize the data processing performance.

In some specific implementation modes, the multi-core processing device may comprise local last level caches respectively corresponding to the plurality of cores; the respective cores are configured to access local last level caches of other cores through an on-chip interconnect structure; and the respective local last level caches respectively have corresponding hardware mapping tables thereof. Thus, with respect to the multi-core processing device having the local last level caches (LLCs) respectively corresponding to the plurality of cores, and the respective cores configured to access local last level caches of other cores through the on-chip interconnect structure (for example, the bus, the cross-bar switch, the Mesh, and the like), that is, with respect to the multi-core processing device of an NUCA architecture, through the hardware mapping tables respectively corresponding to the respective local LLCs, data may be transmitted to the LLC corresponding to the target core, instead of having to be transmitted to the private cache of the target core, which may also implement fast delivery of the cache line of the multi-core processing device of a distributed shared cache structure to a certain extent, and shorten data transmission latency, and may further improve the data processing speed of the multi-core processing device and optimize the data processing performance. It may be implemented on instruction by configuring different hint bits with a same instruction group.

Figure 3:
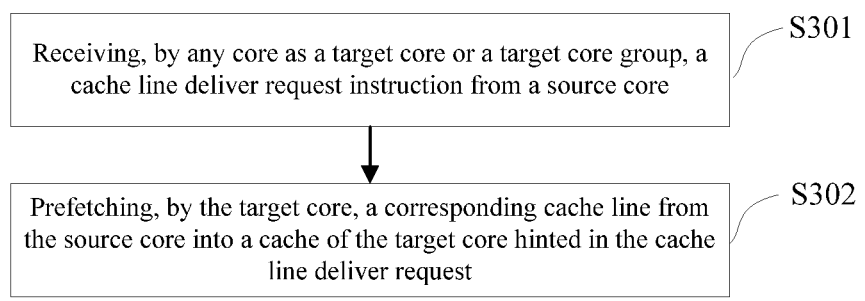
FIG. 3 is a flow chart of an inter-core data transmission method of a multi-core processor according to some embodiments of the present disclosure.

With reference to a flow chart of an inter-core data transmission method of a multi-core processor shown in FIG. 3, in some embodiments of the present disclosure, a multi-core processor comprises a plurality of cores, each core includes at least one level cache, and inter-core data transmission may be performed by using a method below:

S301: receiving, by any core as a target core or of a target core group, a cache line deliver request instruction from a source core.

S302: pre-fetching, by the target core, a corresponding cache line from the source core into a cache of the target core hinted in the cache line deliver request.

According to above-described data transmission method used among the plurality of cores of the multi-core processor, when any core as a target core or of a target core group receives the cache line deliver request instruction from the source core, it pre-fetches the corresponding cache line from the source core to a cache of the any core, other than looking up when the target core needs the cache line, which, thus, may greatly shorten inter-core data transmission latency of a multi-core processing device, and may further improve a data processing speed and optimize a data processing performance.

In some specific implementation modes, the multi-core processor may comprise an inter-core processing unit, the inter-core processing unit may include a hardware thread mapping table, the hardware mapping table may be coupled with the plurality of cores and shared by the plurality of cores; when receiving the cache line deliver request instruction from the source core, the inter-core processing unit may look up a target physical core identifier corresponding to a target software thread identifier in the cache line deliver request instruction in the hardware mapping table and dispatches the cache line deliver request instruction to the target core corresponding to the target physical core identifier found out.

In order to enable those skilled in the art to better understand and implement the embodiments of the present disclosure, hereinafter, it is illustrated in detail through a specific exemplary application scenario. In the exemplary application scenario, the source core is a producer core, the target core is a consumer core, and a thread in the source core and a thread in the target core form a basic model for interaction between the producer and the consumer.

Figure 4:
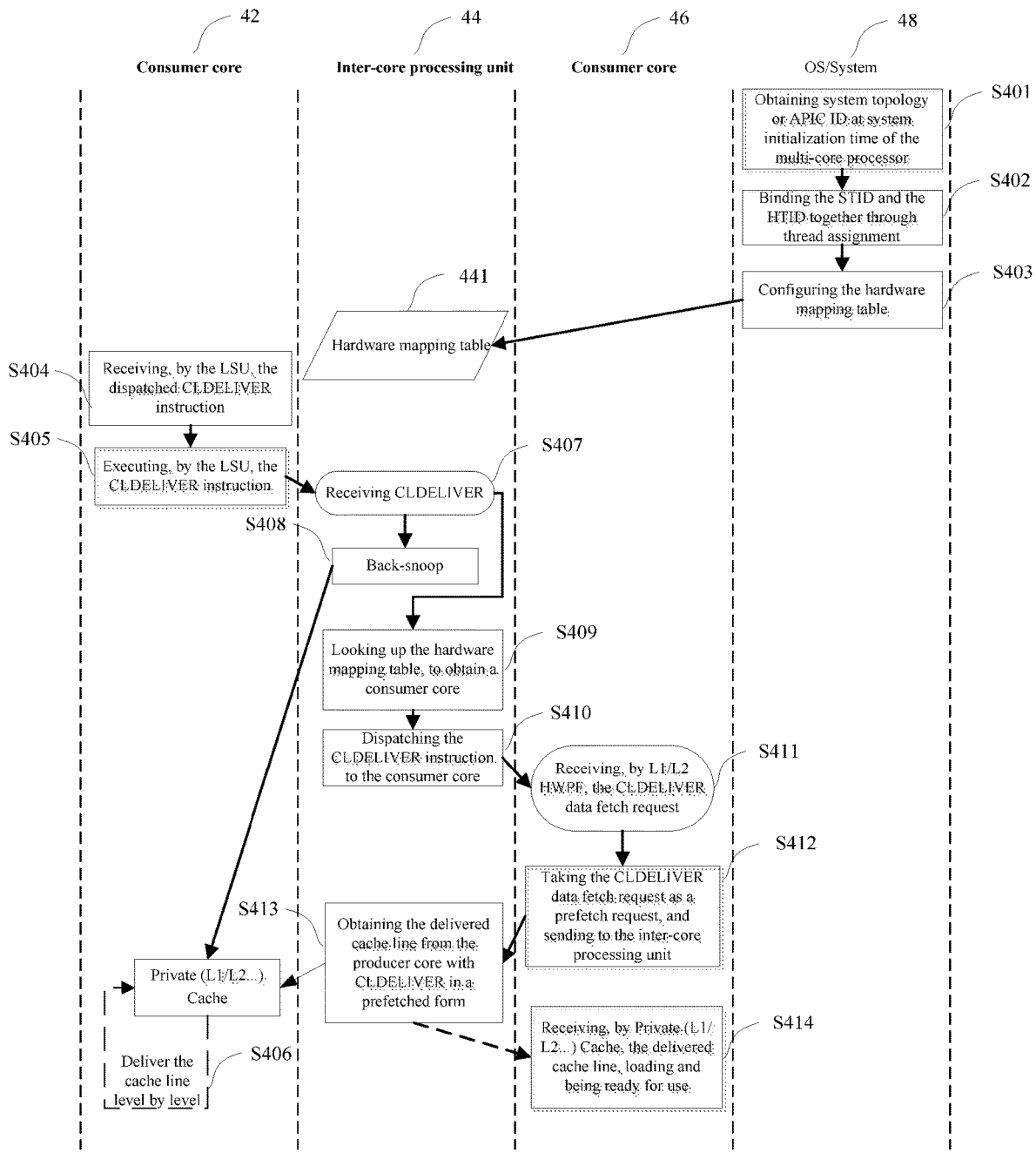
FIG. 4 is a schematic diagram of CLDELIVER instruction stream transmission in an inter-core data transmission method of a multi-core processor according to some embodiments of the present disclosure.

FIG. 4 illustrates an inter-core data transmission flow of a multi-core processor according to some embodiments of the present disclosure, which will be described in detail below through specific steps with reference to FIG. 2 and FIG. 4.

Firstly, a hardware mapping table 441 may be configured by an OS/System 48, which, in some specific implementation modes, may be implemented through steps S401 to S403.

S401: obtaining system topology or APIC ID at system initialization (reset) time of the multi-core processor.

An "HTID" of a physical core may be obtained at system initialization (reset) time of the multi-core processor. The hardware assigned APIC ID is based on system topology and includes encoding for CPU socket position and cluster information. The operating system automatically updates the hardware thread mapping table dynamically during an application startup process.

S402: binding the STID and the HTID together through thread assignment.

In some embodiments of the present disclosure, as described above, since CLDELIVER is an instruction, a mapping mechanism is required to link the software thread ("STID") to the physical core ("HTID"). The mapping relationship is maintained by an operating system at application runtime. In specific implementation, when task decomposition and parallelization assignment are performed in a software level, a corresponding software thread identifier STID exists correspondingly, with respect to whether it is a producer or a consumer, to which a software thread that may be established in a specific data region corresponds. A role of a thread or a processing core corresponding thereto as a producer or a consumer is determined by dependency relationship among threads for processing specific shared data. For example, a certain thread is a consumer relative to a previous thread in its task pipeline, and is a producer relative to a next thread in its task pipeline. In some embodiments of the present disclosure, a producer core is a source core, and a consumer core is a target core.

During an operation procedure at startup or runtime, various software components and firmware are loaded into system memory, and executed on respective cores, and these procedures include an execution thread or a slave thread (a process similar to the thread). According to a specific processor or a SoC architecture, a given physical core may be implemented by one or more logical cores and assign the process to respective logical cores. In some embodiments of the present disclosure, each physical core is implemented by two logical cores.

Through thread assignment, the software thread identifier STID and the physical core identifier HTID may be bound together.

S403: configuring, by the OS/System 48, the hardware mapping table (STID-HTID Mapper) 441.

In some specific implementation modes, the hardware mapping table 441 may be placed at a location that may be coupled with the respective cores, for example, placed within the inter-core processing unit 44. The inter-core processing unit 44 may be provided at a location coupled with the respective cores, and the hardware mapping table 441 is placed at a same level as the LLC.

In some specific implementation modes, the HTID in the hardware mapping table may be an identifier of a core, or a group of cores, or all cores of the multi-core processor; and the specific number corresponding thereto or core types may be configured according to needs.

Since the hardware mapping table may be automatically configured at system initialization time, a software developer may directly use the cache line deliver request instruction, without having to pay attention to underlying hardware configuration, so that a difficulty in software development may be reduced.

Hereinafter, it will be illustrated in detail through an inter-core data deliver flow of a thread in a task pipeline.

On a producer core 42 side, the CLDELIVER instruction may process data in an LSU or each level of cache.

Firstly, on the producer core 42 side, the CLDELIVER instruction may be executed in the LSU, for which steps S404 to S405, and step S412 may be referred to specifically.

S404: receiving, by the LSU, the dispatched CLDELIVER instruction.

In some specific implementation modes, the LSU may receive a program instruction stream assigned by a dispatch unit, and the program instruction stream may include the CLDELIVER instruction.

S405: executing, by the LSU, the CLDELIVER instruction.

The CLDELIVER instruction may include a virtual address of the cache line and various hints (for example, target core software thread identifier STID, cache-level, priority, and the like). The target software thread identifier STID is configured to represent a target software thread identifier corresponding to the cache line; the cache-level hints a cache of the target core corresponding to the cache line; the priority is configured to represent a priority of processing the CLDELIVER instruction within the target core, the priority of the cache line deliver request instruction may be set higher than a priority of other pre-fetch transaction, or may be set equal to a priority of a preset instruction (for example, a Command instruction), or may correspond to different priorities based on different memory request types, and specifically, may be flexibly set according to needs.

S406: flowing down, by the CLDELIVER, the LSU lookup pipeline.

In some specific implementation modes, when the producer core 42 has multi-level caches, the CLDELIVER may flow down the LSU lookup pipeline. Specifically, on a cache hit, if the cache line is dirty or a next level cache is non-inclusive, the cache line may be read out from a cache array and written into a victim buffer. On a cache miss, as a design choice, the CLDELIVER instruction may be dropped if the target core has already requested this cache line. Alternatively, on a cache miss, the CLDELIVER instruction is sent out to a next level cache to decide how to proceed.

In some specific implementation modes, unless the LSU decides to drop the CLDELIVER instruction, its physical address and hints are all written into the victim buffer.

In some specific implementation modes, the CLDELIVER instruction including the physical address, the hints, and other potential data is sent to the next level cache with an entry of the victim buffer.

As an optional design solution, on the producer core 42 side, similar to steps S404 to S406, the CLDELIVER instruction may process a cache line of a non-first level cache.

For example, the producer cache 42 includes a Private L2 Cache, and the L2 cache receives the CLDELIVER instruction from the internal snoop-response interface; for simplicity, it is assumed that the L2 cache is inclusive, which is a common case to filter out snoops to the L1 cache.

The CLDELIVER instruction may flow down the L2 cache lookup pipeline. For example, on a cache hit: if the CLDELIVER instruction comes with dirty data (rewritten data) from the L1 cache, it may simply invalidate the cache line in the L2 cache; else, it may read out the cache line data. On a cache miss: since the L2 cache is assumed to be inclusive, the CLDELIVER instruction must not come with data from the L1 cache. Again as a design choice, the CLDELIVER instruction may be directly dropped if the consumer core has already requested the cache line. For simplicity, with respect to each private cache-level within the producer core 42, drop-on-miss will be the assumption going forward.

Similarly, unless the Private L2 Cache decides to drop the CLDELIVER instruction, the physical address, the hints and the data (either from L1 cache write-back or L2 cache read-out) included thereby are written in the victim buffer of the L2 cache, waiting to be sent out.

The inter-core processing unit 44 may process steps S407 to S10 and step S413 below or participate in interaction thereof. In some specific implementation modes, the inter-core processing unit may be provided at a same level as the LLC, and all or part of the LLC may also serve as a buffer of the inter-core processing unit.

S407: receiving, by the inter-core processing unit 44, the CLDELIVER instruction.

S408: obtaining, by the inter-core processing unit 44, a cache line to be delivered in a back-snoop manner, and loading into the buffer of the inter-core processing unit.

S409: looking up, by the inter-core processing unit 44, the hardware mapping table 441, to obtain a consumer core hinted by the CLDELIVER instruction.

The hardware mapping table 441 may be looked up with the target software thread identifier (Target Soft core ID, STID) in the CLDELIVER instruction, to obtain the target physical core identifier (HTID). It may be understood that, the target physical core identifier in the hardware mapping table is a physical identifier of a core, or a group of cores, or all cores of the multi-core processor.

S410: dispatching the CLDELIVER instruction to a corresponding consumer core.

In some embodiments of the present disclosure, a CLDELIVER data fetch request including a physical address and hints may be generated, and sent to a target core through an external snoop request channel. For example, it may be delivered by a transaction such as a probe.

Next, the consumer core processes the CLDELIVER data fetch request.

S411: receiving, by a hardware pre-fetch of the consumer core 46, the CLDELIVER data fetch request.

In some specific implementation modes, the CLDELIVER data fetch request may be received through a pre-fetch queue. If the consumer core 46 includes a non-first level cache such as the L2 cache, the CLDELIVER data fetch request may be received by a hardware pre-fetch (HWPF) located at a same level.

The L2 cache may check a "target cache-level" identifier (identifier hint of the cache of the corresponding target core) in the CLDELIVER data fetch request.

If the target cache-level is a second level cache L2, the physical address is injected into the L2's hardware pre-fetch request queue. The "priority" hint may either affect an injection location of a CLDELIVER invitation in the queue, or affect the arbitration later.

If the target cache-level is the first level cache L1, the CLDELIVER data fetch request may be delivered to the first level cache L1 through the internal snoop-request channel.

Similarly, if the LSU in the consumer core receives the CLDELIVER data fetch request through the internal snoop-request interface, the physical address may be fetched from the CLDELIVER invitation and injected into the corresponding hardware pre-fetch request queue of the LSU. As described above, the priority hint may be used in a same manner as in the second level cache L2.

S412: taking, by the consumer core 46, the CLDELIVER data fetch request as a pre-fetch request, and sending to the inter-core processing unit 44.

S413: obtaining, by the inter-core processing unit 44, the delivered cache line from the producer core with CLDELIVER in a pre-fetched form.

S414: receiving, by the private cache of the consumer core 46, the delivered cache line, loading and being ready for use.

It may be understood that, the multi-core processing device according to the embodiment of the present disclosure may be a homogeneous multi-core processor, may also be a heterogeneous multi-core processor, may also be a general-purpose multi-core processor, and may also be a many-core processor, as long as respective cores share a table. A processor or an interconnect structure on the SoC in the multi-core processing device may include any existing interconnect structure, for example, a bus and single or multi-channel serial point-to-point, ring or mesh interconnect structure.

It should be noted that, in this specification, the phrase "in some specific implementation modes" or "in some embodiments of the present disclosure" does not necessarily refer to a same embodiment. Furthermore, particular features, structures, or characteristics may be combined in any suitable manner in one or more embodiments.

Although the present disclosure has been disclosed above, the present disclosure is not limited thereto. Any ordinarily skilled in the art can also make various changes and modifications within the spirit and scope of the present disclosure; therefore, the protection scope of the present disclosure is determined by the appended claims.

What is claimed is:

1. A multi-core processing device comprising a plurality of cores, each core includes at least one level cache, wherein when any core as a target core or of a target core group receives a cache line deliver request instruction from another core as a source core, the any core pre-fetches a corresponding cache line from the source core to a cache of the any core; and the cache line deliver request instruction includes an identifier hint of the target core, wherein
    the cache line deliver request instruction includes a virtual address of the cache line and includes a target software thread identifier; and
    the multi-core processing device further comprises an inter-core processing unit coupled with the plurality of cores, the inter-core processing unit includes:
        a hardware mapping table coupled with the plurality of cores and shared by the plurality of cores, the hardware mapping table storing a mapping relationship between the target software thread identifier corresponding to the cache line and a target physical core identifier;
        a lookup circuit, configured to look up the hardware mapping table, to obtain the target physical core identifier corresponding to the target software thread identifier included in the cache line deliver request; and
        an instruction dispatch circuit, configured to dispatch the cache line deliver request to the target core corresponding to the target physical core identifier searched through the lookup circuit.

2. The multi-core processing device according to claim 1, wherein the target physical core identifier in the hardware mapping table is a physical identifier of a core, or a group of cores, or all cores of the multi-core processing device.

3. The multi-core processing device according to claim 1, wherein the hardware mapping table is suitable to be configured at system initialization or resetting time, the target software thread identifier is assigned by a parallel compiler at compiling time; the target physical core identifier is configured to be obtained at the initialization or resetting time of the multi-core processing device, and the target physical core identifier is based on system topology.

4. The multi-core processing device according to claim 1, wherein the cache line deliver request instruction further includes an identifier hint of a cache of the target core corresponding to the cache line, each of the cores includes a data pre-fetch, and the target core is configured to receive the cache line deliver request instruction through the data pre-fetch of the target core.

5. The multi-core processing device according to claim 4, wherein the data pre-fetch is a hardware pre-fetch.

6. The multi-core processing device according to claim 5, wherein each level of cache of the target core has a corresponding hardware pre-fetch.

7. The multi-core processing device according to claim 4, wherein the source core comprises a load-store unit, and the load-store unit or any level cache of the source core is configured to send the cache line deliver request instruction.

8. The multi-core processing device according to claim 7, wherein the load-store unit of the source core is configured to read out the cache line from a cache array and write into a victim buffer if the cache line is dirty or a next level cache is non-inclusive, on a cache hit.

9. The multi-core processing device according to claim 7, wherein the load-store unit of the source core is configured to drop the cache line deliver request instruction, when the target core has already requested the cache line, upon a cache miss.

10. The multi-core processing device according to claim 7, wherein the load-store unit of the source core is configured to send the cache line deliver request instruction to a next level cache to decide how to proceed, upon a cache miss.

11. The multi-core processing device according to claim 7, wherein any middle level cache of the source core includes an internal snoop-response interface, configured to deliver the cache line deliver request instruction, and the any middle level cache is inclusive.

12. The multi-core processing device according to claim 11, wherein any non-first level cache of the source core is configured to, upon a cache hit, invalidate the cache line, if the cache line deliver request instruction requests dirty data from a previous level cache, else read out the cache line data.

13. The multi-core processing device according to claim 12, wherein any non-first level cache of the source core is further configured to write the cache line data in a victim buffer of a middle level cache, where the cache line data wait to be sent out.

14. The multi-core processing device according to claim 12, wherein any non-first level cache of the source core is configured to drop the cache line deliver request instruction, upon a cache miss.

15. The multi-core processing device according to claim 1, wherein the inter-core processing unit further includes: an external snoop-request channel, configured to deliver the cache line deliver request instruction to the target core.

16. The multi-core processing device according to claim 1, wherein the plurality of cores belong to different core complexes or clusters, and respective core complexes or clusters are coupled through an interconnect structure, and the hardware mapping table is respectively coupled with the respective core complexes or clusters.

17. The multi-core processing device according to claim 1, further comprising at least one level shared cache, wherein the shared cache is respectively coupled with the plurality of cores, and the at least one level shared cache respectively has a corresponding hardware mapping table thereof or there is only one level shared cache having a corresponding hardware mapping table.

18. The multi-core processing device according to claim 1, further comprising: local last level caches respectively corresponding to the plurality of cores, wherein the respective cores are configured to access local last level caches of other cores through an on-chip interconnect structure, and the respective local last level caches respectively have corresponding hardware mapping tables thereof.

19. The multi-core processing device according to claim 1, wherein the source core is a producer core, and the target core is a consumer core.

* * * * *